US010387597B2

United States Patent
(12) United States Patent
Wachs et al.

(10) Patent No.: US 10,387,597 B2
(45) Date of Patent: Aug. 20, 2019

(54) ENERGY ANALYSIS FOR DIFFERENTIAL POWER ANALYSIS RESISTANCE

(71) Applicant: CRYPTOGRAPHY RESEARCH, INC., Sunnyvale, CA (US)

(72) Inventors: Megan Anneke Wachs, San Francisco, CA (US); Hai Lan, Fremont, CA (US); Andrew John Leiserson, San Francisco, CA (US); Joseph William Inkenbrandt, San Francisco, CA (US); Ralf Michael Schmitt, Mountain View, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 453 days.

(21) Appl. No.: 14/896,877

(22) PCT Filed: Jun. 20, 2014

(86) PCT No.: PCT/US2014/043493
§ 371 (c)(1),
(2) Date: Dec. 8, 2015

(87) PCT Pub. No.: WO2014/205398
PCT Pub. Date: Dec. 24, 2014

(65) Prior Publication Data

US 2016/0140274 A1 May 19, 2016

Related U.S. Application Data

(60) Provisional application No. 61/838,195, filed on Jun. 21, 2013.

(51) Int. Cl.
*G06F 17/50* (2006.01)
*G01R 27/02* (2006.01)
(Continued)

(52) U.S. Cl.
CPC ......... *G06F 17/5036* (2013.01); *G01R 27/02* (2013.01); *G06F 17/50* (2013.01); *G11C 29/50* (2013.01); *H04L 9/003* (2013.01)

(58) Field of Classification Search
None
See application file for complete search history.

(56) References Cited

U.S. PATENT DOCUMENTS 6,075,932 A * 6/2000 Khouja .............. G06F 17/5022 702/60
2006/0200514 A1* 9/2006 Fischer ..................... G06F 7/38 708/446
(Continued)

FOREIGN PATENT DOCUMENTS

WO 2014205369 A1 12/2014

OTHER PUBLICATIONS

International Search Report and Written Opinion, Application No. PCT/US2014/043493, dated Oct. 15, 2014.
(Continued)

*Primary Examiner* — Syed A Roni
(74) *Attorney, Agent, or Firm* — Lowenstein Sandler LLP

(57) ABSTRACT

A first and second set of simulation information of a circuit design may be received. Energy consumption values associated with signals may be calculated for each of the first and second sets of simulation information of the circuit design. The energy consumption values associated with the transitions of the plurality of signals for each time point of a plurality of time points may be aggregated based on when each of the transitions of the signals occurs for each of the first and second sets of simulation information. Furthermore, a possible Differential Power Analysis (DPA) leak may be identified at one of the time points based on a difference in
(Continued)

200

Receive simulation information associated with a circuit
210

Calculate energy consumption associated with the circuit based on the simulation information
220

Identify DPA leaks of the circuit based on differences associated with the calculated energy consumption
230 aggregated energy consumption values between the first and second sets of simulation information.

17 Claims, 11 Drawing Sheets

(51) Int. Cl.
*G11C 29/50* (2006.01)
*H04L 9/00* (2006.01)

(56) References Cited

U.S. PATENT DOCUMENTS

2007/0219735 A1 9/2007 Saeki et al.
2008/0221854 A1 9/2008 Arimoto et al.
2009/0006012 A1 1/2009 Kawabe
2010/0057429 A1 3/2010 Srinivasan
2010/0091982 A1 4/2010 Kocher et al.
2010/0153744 A1 6/2010 Nobukata
2010/0246808 A1 9/2010 Hisakado et al.
2011/0029292 A1* 2/2011 Schellekens ........ G06F 17/5022 703/2
2013/0129083 A1 5/2013 Fujin

OTHER PUBLICATIONS

International Search Report and Written Opinion, Corrected, Application No. PCT/US2014/043447, dated Oct. 16, 2014.

Suzuki et al. 'DPA Leakage Models for CMOS Logic Circuits'. In Cryptographic Hardware and Embedded Systems CHES Dec. 2005, pp. 366-382. Springer Berlin Heidelberg, 2005.

Mulder et al. 'Practical DPA Attacks on MDPL'. Cryptology ePrint Archive: Report 2009/231 [online], Dec. 2009 [retrieved on Dec. 3, 2015 from eprint.iacr.org/2009/231.pdf].

* cited by examiner

ENERGY ANALYSIS FOR DIFFERENTIAL POWER ANALYSIS RESISTANCE

RELATED APPLICATION

This application claims the benefit of U.S. Provisional Application No. 61/838,195, filed on Jun. 21, 2013, which is incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
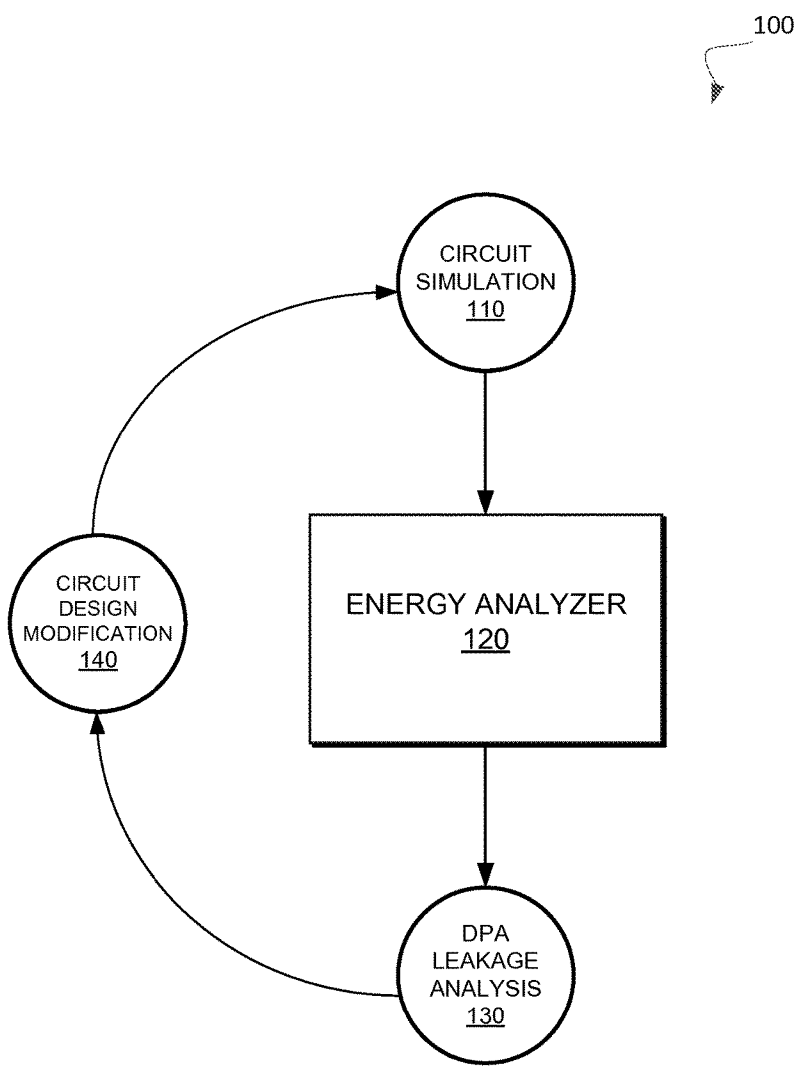
FIG. 1 illustrates an example environment to analyze energy use of a circuit to determine Differential Power Analysis (DPA) resistance accordance with some embodiments.

Aspects of the present disclosure are directed to an energy analysis associated with Differential Power Analysis (DPA) resistance of a circuit design. In some embodiments, a circuit design corresponding to a circuit may be simulated and the energy consumption of the circuit may be determined from the resulting simulation information. For example, a simulation of the circuit may involve a varying input (i.e., a stimulus) where the signals of the circuit may be observed and analyzed in response to the varying input or stimulus. Such a simulation may be referred to as a logic simulation. The signals of the circuit may transition from a first logical state (e.g., a value of '0') to a second logical state (e.g., a value of '1') or may transition from the second logical state to the first logical state. Such transitions of the signals may be recorded in the simulation information and used to derive energy consumption of the circuit at particular time periods. The simulation information may represent data resulting from the circuit simulation.

The energy analysis of the simulation information of a circuit may indicate whether the circuit is susceptible or less resistant to a side channel attack. An example of a side channel attack includes, but is not limited to, Differential Power Analysis (DPA) where an attacker who seeks to obtain information from the circuit may study the power consumption of the circuit. For example, the circuit may be a cryptographic hardware circuit that may use a cryptographic key or other such secret information to encrypt or decrypt data. An attacker may be an unauthorized entity who may obtain the cryptographic key from the cryptographic hardware circuit by analyzing power consumption measurements of the cryptographic hardware circuit over a period of time.

The transitions of the signals of the cryptographic hardware circuit may consume power and such power consumption from the rising transitions and falling transitions of the signals may make the cryptographic hardware circuit more susceptible to a DPA attack. For example, a DPA attack may employ statistical techniques to extract the cryptographic key from power consumption measurements of the signals of the cryptographic hardware circuit. An analysis of the simulation information of a circuit design corresponding to a cryptographic hardware circuit may be used to identify if the circuit is susceptible to a DPA attack.

The simulation of the circuit may result in a record of activity of the circuit in response to the input or stimulus to the circuit. For example, signal transitioning information (also referred to as toggling information), capacitance information, and leakage information may be recorded in one or more simulation related files. However, with regard to a DPA leak, particular types (e.g., a subset) of information in the simulation related files may be more relevant to determine if the circuit is more susceptible to a DPA attack. For example, energy consumption related to the transitions of the signals may be more relevant with regard to identifying a possible DPA leak (e.g., an occurrence of energy or power consumption that may contribute to the susceptibility of the circuit to a DPA attack). In some embodiments, switching power and internal power associated with cells of a design may be used to determine if the circuit is associated with a possible DPA leak. Furthermore, an energy consumption of the circuit may be determined based on the switching power and the leakage power of particular components in the circuit.

Furthermore, an analysis of the simulation information of a circuit to identify a possible DPA leak may require an analysis of energy consumption as opposed to power consumption of the circuit. For example, to identify a possible DPA leak, energy consumption of the circuit at discrete time periods (e.g., at time periods of less than a clock cycle) may be calculated as opposed to power consumption which may provide a general energy over time analysis. The energy analysis of the simulation information may provide for instantaneous energy consumption of portions of the circuit at multiple time points. If the statistical difference in energy consumption based on a value of a selector signal or bit at one time point is excessive, then a DPA leak may have occurred at the time point. Subsequently, the activity of the circuit at the time point (e.g., the signal transitions) may be identified as a contributor to a possible DPA leak. Thus, an analysis providing energy consumption as opposed to merely power consumption may be more conducive to identifying portions of a circuit that may be susceptible to a DPA leak. The portions of the circuit that contribute to the possible DPA leak may then be modified to reduce or eliminate the possible DPA leak.

Thus, portions of simulation information or data of a circuit may be identified and energy consumption at particular time points of the circuit may be identified. In some embodiments, the statistical difference in the energy consumption of the circuit based on a selector at the time points may be displayed in an energy difference waveform. For example, the energy difference waveform may be used to illustrate or display statistical difference in the energy consumption related to a possible DPA leak in a circuit at various time periods. In some embodiments, if the statistical difference in the energy consumption of the circuit at a time point exceeds a threshold value then the circuit may be associated with a possible DPA leak at the time point. The energy difference waveform may be used to identify a time point when the possible DPA leak occurred in the circuit and the circuit design may then be analyzed to determine which portions of the circuit design contributed to the DPA leak. The portions of the circuit design that contributed to the possible DPA leak (e.g., components associated with signals that transitioned at the time point corresponding to the DPA leak) may be subsequently modified to remove or reduce the risk of a DPA leak.

As previously described, a possible DPA leak or an indication of a DPA leak may be identified based on a difference (e.g., a statistical difference as described below) between the energy consumption of the circuit in response to a first input and the energy consumption of the same circuit in response to a second input. For example, a first set of simulation information or data of the circuit in response to the first input may be compared with a second set of simulation information or data of the circuit in response to the second input. In some embodiments, the first input may differ from the second input by a particular input bit or signal (e.g., a specific input bit may be a '0' for the first input and the input bit may be a '1' for the second input). Differences in energy consumption between the first and second set of simulation information or data may be calculated (e.g., by subtracting energy consumption values of the second set from the first set or by calculating a statistical difference between the energy consumption values of the first set and the energy consumption values of the second set). The resulting energy consumption difference may illustrate the average effect of the input bit on the performance of the circuit and its energy consumption. In some embodiments, if the difference in energy consumption at a particular time period exceeds a threshold value then a possible DPA leak may be identified as occurring in the circuit at the particular time point. The circuit design may then be analyzed for signal transition activity at the particular time point to determine portions of the circuit design that are associated with the possible DPA leak and such portions may be modified to reduce or eliminate the possible DPA leak.

Thus, simulation information or data corresponding to a circuit may be received. Portions of the simulation information or data that may be relevant to a DPA analysis may be identified. Energy consumption of the circuit may be calculated or determined based on the portions of the simulation information or data that have been identified as being more relevant to a DPA analysis. The statistical difference in the energy consumption of the circuit may be calculated or determined based on an energy difference waveform that may be provided to illustrate energy consumption of the circuit at particular time points. If the statistical difference in energy consumption at a particular time point exceeds a threshold value then the circuit may be associated with a possible DPA leak at the particular time point. Accordingly, the behavior of the circuit (e.g., signal transitions) in response to simulation input may be analyzed at the particular time point to identify particular portions of the circuit that may contribute to the possible DPA leak. Such identified portions of the circuit may then be modified to eliminate or reduce the risk of a possible DPA leak.

FIG. 1 illustrates an example environment 100 to analyze energy use or consumption of a circuit to determine a Differential Power Analysis (DPA) resistance of the circuit. In general, the example environment 100 illustrates the analysis of simulation information of a circuit design corresponding to a circuit to identify a DPA leak in the circuit. In some embodiments, a DPA leak may refer to portions of a circuit that may be susceptible to a DPA attack.

As shown in FIG. 1, the example environment 100 includes circuit simulation information 110 (e.g., one or more circuit simulation files) that may represent an operation of a circuit. In some embodiments, the circuit simulation information 110 may include information identifying activity of the circuit in response to a varying stimulus or input. For example, the circuit simulation information 110 may include signal transition activity of the circuit at various time points in response to a varying input or stimulus to the circuit. The environment 100 may further include an energy analyzer 120. The energy analyzer 120 may receive the circuit simulation information 110 and may analyze the circuit simulation information 110 to produce a DPA leakage analysis 130. In some embodiments, the DPA leakage analysis 130 may provide an energy difference waveform that corresponds to statistical difference in energy consumption of the circuit at various time points based on the circuit simulation information 110. In the same or alternative embodiments, the energy difference waveform provided by the DPA leakage analysis 130 may be used to identify a DPA leak associated with the circuit if the statistical difference in energy consumption of the circuit exceeds a threshold value at one of the time points of the energy waveform. Further details with regard to the energy analyzer 120 are described with regard to FIGS. 2-10C.

The identification of a possible DPA leak associated with the circuit may be used to modify the circuit's design to reduce or eliminate the possible DPA leak. For example, the DPA leakage analysis 130 may be used to identify time points where a possible DPA leak occurs in the circuit. The activity of the circuit may be analyzed at the time points where the possible DPA leak has occurred. For example, signals of the circuit that have transitioned at a corresponding time of the possible DPA leak may be identified and analyzed as possible reasons for the possible DPA leak. Thus, a modified circuit design 140 may be created based on the signals that have transitioned at the time of the identified possible DPA leak. Subsequently, the modified circuit design 140 may be simulated and the simulation information of the modified circuit design 140 may be analyzed for additional possible DPA leaks by the energy analyzer 120.

As such, the energy analyzer 120 may be used as part of a design cycle or methodology for reducing or eliminating possible DPA leaks in a circuit. For example, the energy analyzer 120 may be used to identify time points associated with a possible DPA leak, a circuit design may be modified based on the time points associated with the possible DPA leak, and the modified circuit design may be subsequently analyzed for additional possible DPA leaks.

Figure 2:
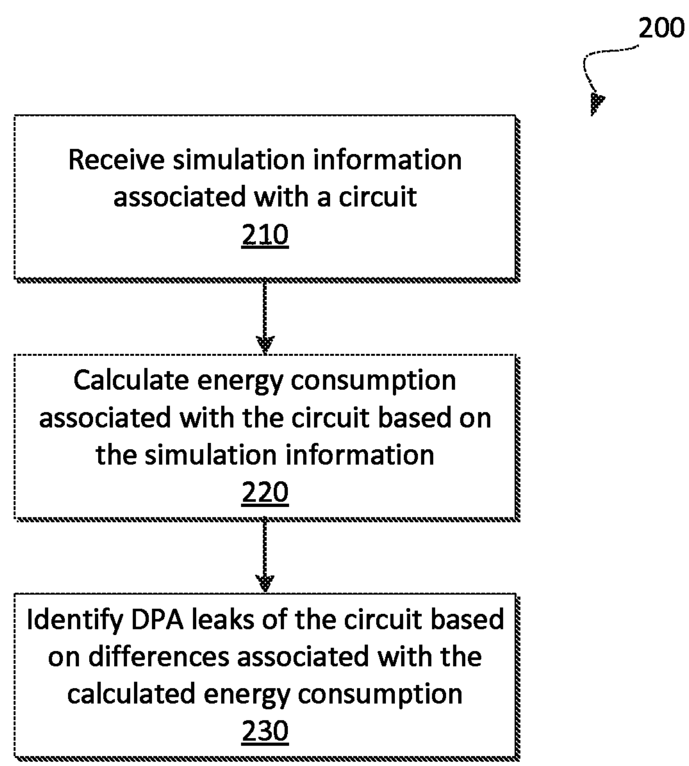
FIG. 2 is a flow diagram of an example method to analyze simulation information of a circuit to identify a possible DPA leak in accordance with some embodiments of the present disclosure.

FIG. 2 is a flow diagram of an example method 200 to analyze simulation information of a circuit to identify a possible DPA leak. In general, the method 200 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 200 may be performed by the energy analyzer 120 of FIG. 1.

As shown in FIG. 2, the method 200 may begin with the processing logic receiving simulation information associated with a circuit (block 210). In some embodiments, the simulation information may correspond to logic simulation. For example, a file that describes or has recorded the transitions or toggling activity of signals in a circuit design corresponding to the circuit may be received. The simulation information associated with the circuit may include, but is not limited to, an identification of a component or logical block of the circuit, an identification of a signal of the component or logical block of the circuit, a time point for the signal of the component or logical block, and a type of transition associated with the signal at the time point (e.g., a rising transition or a falling transition). In some embodiments, the component or logical block of the circuit may be a cell that represents a circuit design abstraction that corresponds to a logical function of the circuit design. The simulation information may further include additional information such as, but not limited to, capacitance information associated with loading of the cells and of the interconnect wires, transition times associated with signals of the circuit, or any other information associated with a simulation of a circuit or with characteristics of components or signals of the circuit. For example, additional simulation related files may include, but are not limited to, a file identifying parasitic information associated with interconnect wires, a file identifying transition times associated with input signals of cells, a file that identifies placements and signal routes between cells or other circuit components, and a file that identifies a logical construction or configuration of a cell.

The processing logic may further calculate energy consumption associated with the circuit based on the received simulation information (block 220). In some embodiments, the energy consumption of the circuit may be calculated or determined based on the energy used or consumed by signal transitions of the circuit in response to varying inputs. In the same or alternative embodiments, the energy consumption of the circuit at specific time points may be determined. For example, energy consumption associated with multiple signals of the circuit may be aggregated at each time point to determine or calculate a total or aggregated energy consumption of the circuit at each time point.

Referring to FIG. 2, the processing logic may further identify DPA leaks of the circuit based on differences (e.g., statistical differences) associated with the calculated energy consumption (block 230). For example, if the statistical difference in aggregated energy consumption of the signals of the circuit at a specific time point exceeds a threshold value then a DPA leak may be identified as having occurred at the time point. In some embodiments, the threshold value may be specified by user input. However, if the statistical difference in aggregated energy consumption of the signals of the circuit at the time point does not exceed a threshold value then a possible DPA leak may not be identified as occurring at the time point. Furthermore, in some embodiments, the possible DPA leak may be identified based on a statistical difference between a first group of simulation information associated with the circuit corresponding to a first value for an input to the circuit or intermediate value associated with the circuit and a second group of simulation information associated with the circuit corresponding to a second value for the same input to the circuit or intermediate value associated with the circuit. If the statistical difference in energy consumption between a time point for the first group of simulation information and a corresponding time point for the second group of simulation information exceeds a threshold value then a possible DPA leak may be identified as occurring at the time point. Further details with regard to identifying a possible DPA leak based on energy consumption are described below.

Figure 3:
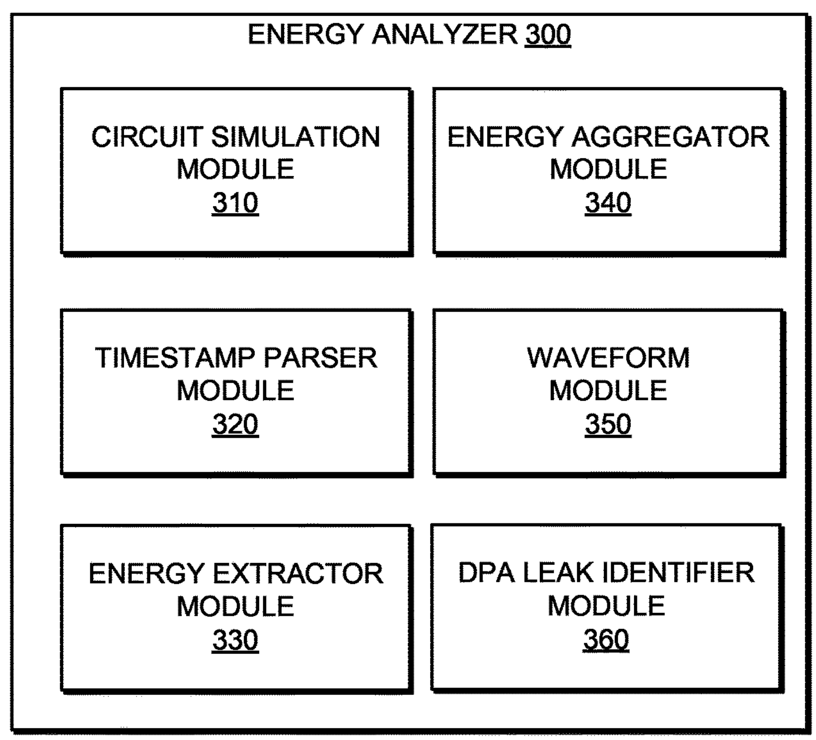
FIG. 3 is a block diagram of an example energy analyzer in accordance with some embodiments of the present disclosure.

FIG. 3 is a block diagram of an energy analyzer 300. In general, the energy analyzer 300 may correspond to the energy analyzer 120 of FIG. 1. The energy analyzer 300 may include a circuit simulation module 310, a timestamp parser module 320, an energy extractor module 330, an energy aggregator module 340, a waveform module 350, and a DPA leak identifier module 360. In alternative embodiments, the functionality of one or more of the modules may be combined or divided.

As shown in FIG. 3, the circuit simulation module 310 may receive simulation information associated with a circuit. However, in alternative embodiments, the circuit simulation module 310 may simulate a circuit design based on a varying input to the circuit design. The timestamp parser module 320 may identify portions of the simulation information received or generated by the circuit simulation module 310 that may be associated or relevant to a DPA analysis for identifying a potential DPA leak. For example, the simulation information of the circuit may include multiple timestamps of signal activity associated with the simulation of the circuit. In some embodiments, each timestamp may be associated with any signal transition that occurred in the circuit at the time corresponding to the timestamp. The timestamp parser module 320 may identify a subset of the timestamps of the signal activity that are associated with a DPA analysis. For example, timestamps including signal transitions that result in specific types of energy or power consumption may be identified from the simulation information of the circuit.

The energy extractor module 330 may calculate or determine an amount of energy used or consumed for a particular signal activity of the circuit. For example, the energy extractor module 330 may calculate or determine an amount of energy used or consumed for a transition of a signal of the circuit. Additional details with regard to the types of energy or power consumption that may be associated with a DPA analysis and the calculating of the energy consumed are described with relation to FIG. 6.

The energy aggregator module 340 may aggregate energy consumption measurements associated with a single time point. For example, the energy consumption of signals associated with a DPA analysis may be aggregated for each time point. As an example, a first time point may include a transition of a first signal and a transition of a second signal and a second time point may include a transition of the second signal and a transition of a third signal. The aggregation of the energy consumption of the first time point may be based on the energy consumed or used when the first signal transitions and when the second signal transitions. For example, the energy consumed when the first signal transitions may be added to the energy consumed when the second signal transitions. Furthermore, the aggregation of the energy consumption of the second time point may be based on adding the energy consumed by the transitioning of the second signal with the energy consumed by the transitioning of the third signal. As such, for each time point, energy consumed by multiple signals may be aggregated to obtain total energy consumption for the circuit at each of the time points.

The waveform module 350 may provide an energy waveform corresponding to the aggregated energy consumption of the circuit at each time point. In some embodiments, if the aggregated energy consumption at a specific time point exceeds a threshold value then a DPA leak may be identified as occurring at the specific time point. In alternative embodiments, if a difference in aggregated energy consumption between a first set of simulation information and a second set of simulation information exceeds a threshold value then a possible DPA leak may be identified as occurring at a corresponding time point. Further details with regard to the energy waveforms are described in relation to FIGS. 5 and 10A, 10B, and 10C. Furthermore, the DPA leak identifier module 360 may identify the possible DPA leak based on the difference (e.g., a statistical difference) between the aggregated energy consumption between the first set of simulation information and the second set of simulation information.

Figure 4:
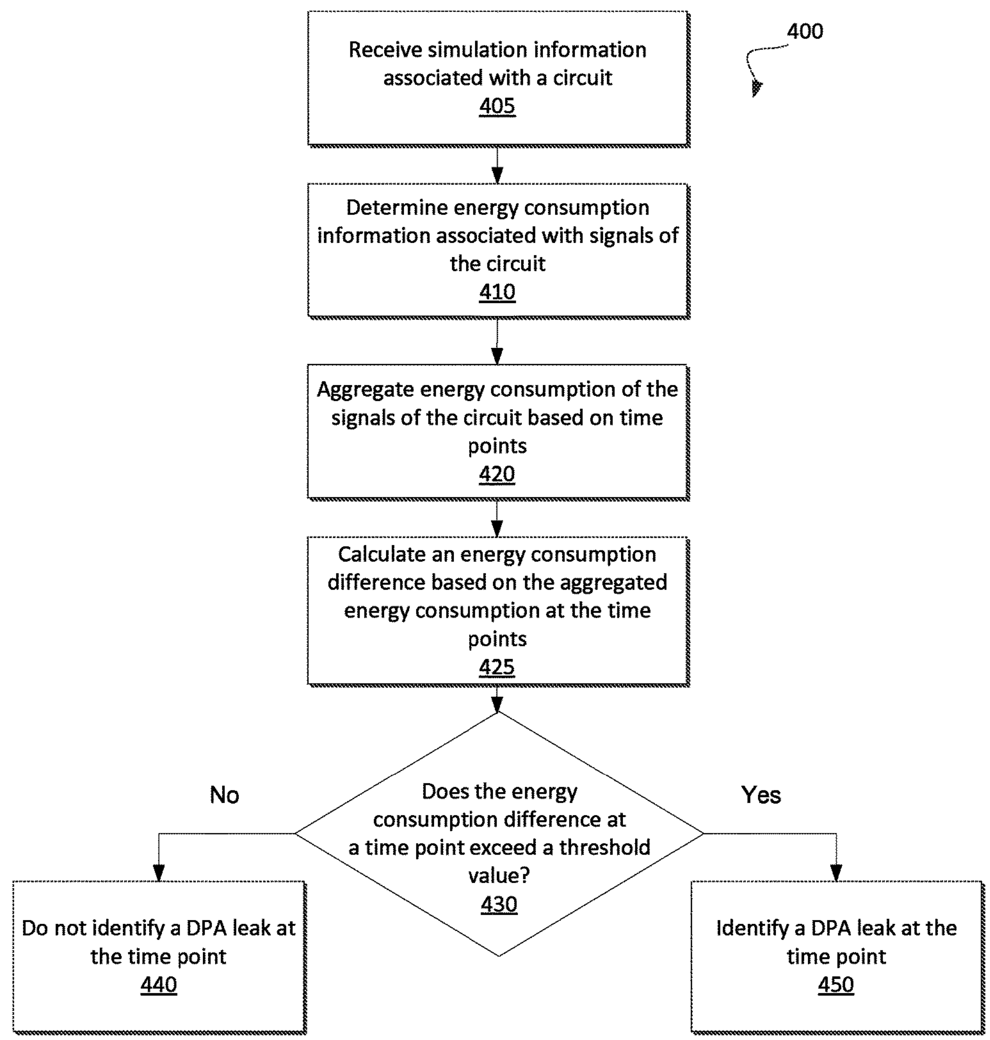
FIG. 4 is a flow diagram of an example method to identify a possible DPA leak based on energy use or consumption in accordance with some embodiments.

FIG. 4 is a flow diagram of an example method 400 to identify a possible DPA leak based on energy use or consumption of a circuit. In general, the method 400 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 400 may be performed by the energy analyzer 120 of FIG. 1 and/or the energy analyzer 300 of FIG. 3.

As shown in FIG. 4, the method 400 may begin with the processing logic receiving simulation information associated with a circuit (block 405). The processing logic may further determine energy consumption information associated with a circuit (block 410). For example, the energy consumption associated with multiple signal transitions of the circuit may be calculated. The processing logic may further aggregate the energy consumption of the signals of the circuit associated with the signal transitions based on time points (block 420). For example, energy consumption of one or more signals from transitions of the one or more signals that occur at a first time point may be aggregated or added and energy consumption of one or more signals from other transitions of one or more signals that occur at a second time point may be aggregated or added together. Further details with regard to the determination of the energy consumption of a circuit are disclosed with reference to FIG. 6. Furthermore, the processing logic may calculate an energy consumption difference based on the aggregated consumption at the time points (block 425). For example, a statistical difference between the energy consumption of the time point of a first set of simulation information (e.g., based on a first value of a selector signal) and the time point of a second set of simulation information (e.g., based on a second value of a selector signal) may be calculated.

The processing logic may further determine whether the energy consumption difference of the time point exceeds a threshold value (block 430). For example, if the difference in energy consumption from signal transitions at the first time point between a first set of simulation information and a second set of simulation information does not exceed the threshold value (e.g., a threshold amount of variance in energy consumption), then a possible DPA leak may not be identified at the first time point (block 440). However, if the difference in energy consumption from signal transitions at the first time point between a first set of simulation information and a second set of simulation information does exceed the threshold value for energy consumption, then a possible DPA leak may be identified as having occurred at the first time point (block 450).

Figure 5:
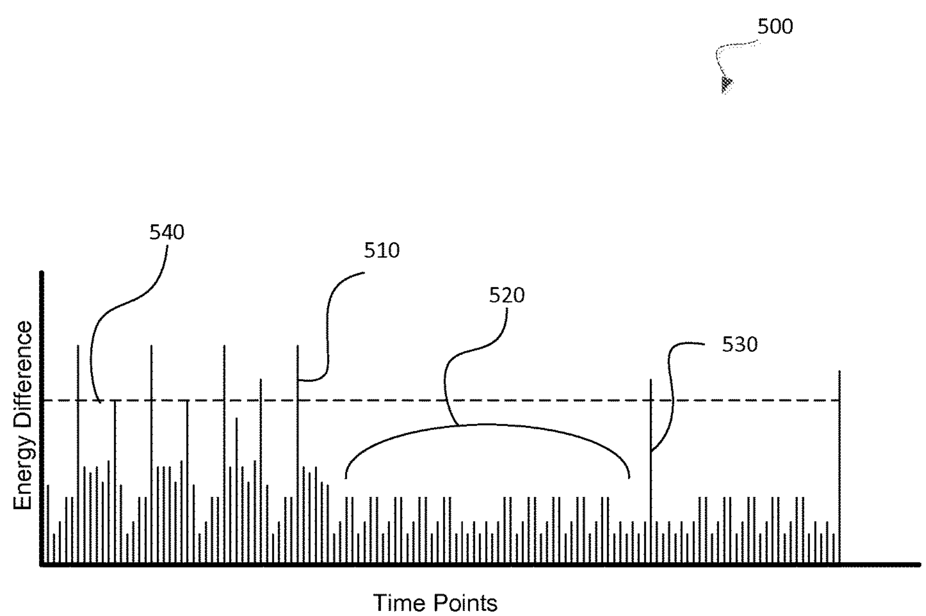
FIG. 5 is an illustration of an example energy waveform in accordance with some embodiments.

FIG. 5 illustrates an example energy waveform 500. In general, the energy waveform 500 may be provided or generated by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the energy waveform 500 may be provided by the energy analyzer 120 of FIG. 1 and/or the energy analyzer 300 of FIG. 3.

As shown in FIG. 5, the energy waveform 500 may represent a difference in energy consumed for multiple time points. For example, the energy waveform 500 may represent a variance or difference for a first set of simulation information and a second set of simulation information in energy consumed or used to provide for signal transitions of a circuit over various time points associated with the first set of simulation information and the second set of simulation information of the circuit design. For example, a first time point 510 may be associated with a first energy difference value, a group of time points 520 may be associated with various energy difference values, and a third time point 530 may be associated with a third energy difference value. In some embodiments, an energy consumption difference value at a single time point that exceeds a threshold energy consumption difference value 540 may be used to identify a potential DPA leak at a particular time point. For example, the first energy difference value associated with the first time point 510 and the third energy consumption difference value associated with the third time point 530 may be determined to exceed the threshold energy consumption difference value 540. Thus, the first time point 510 and the third time point 530 may be identified as time points where a possible DPA leak may have occurred. However, the various energy consumption difference values of the group of time points 520 do not exceed the threshold energy value 540. As such, the group of time points 520 may not be identified as time points where a possible DPA leak may have occurred.

As such, the energy difference waveform may represent differences in energy consumption of a circuit at various time points of a simulation of the circuit. In some embodiments, each time point may be associated with an energy consumption difference value that corresponds to a difference in energy consumption resulting from signal transitions at each corresponding time point. In some embodiments, the difference may be a statistical difference. Further details with regard to calculating a statistical difference are disclosed with relation to FIGS. 7-10C.

Figure 6:
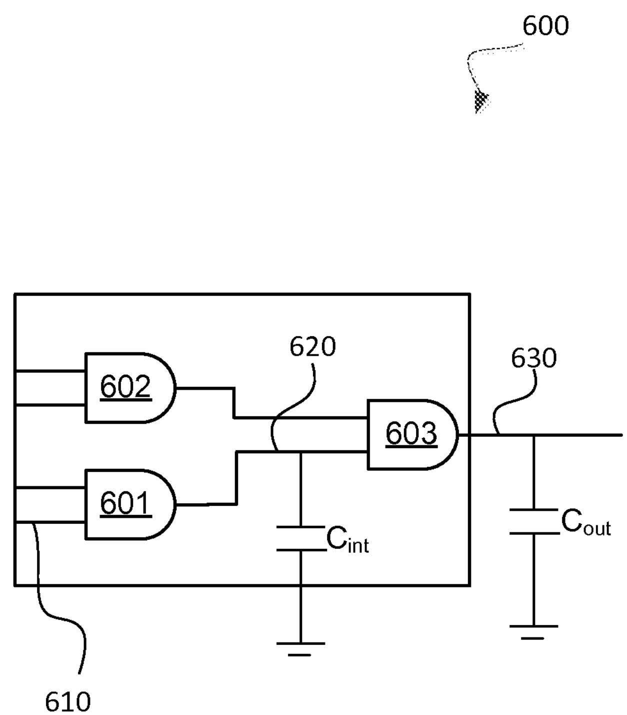
FIG. 6 illustrates a diagram of an example cell used in a circuit design in accordance with some embodiments.

FIG. 6 illustrates a diagram of an example cell 600 used in a circuit design in accordance with some embodiments. In general, the cell 600 may correspond to a portion of a circuit associated with a simulation (e.g., circuit simulation 110). The cell 600 may be a group of circuit components (e.g., logic gates or flip-flops) that provide a logical function or a storage function. In some embodiments, the cell 600 may be a group of transistors.

As shown in FIG. 6, the cell 600 may include logic gates 601, 602, and 603. In operation, the cell 600 may be associated with one or more signal transitions. For example, one of the associated transitions may be a transition of the input signal 610 from a value of '0' to a value of '1.' In some embodiments, such a transition may result in the transition of the signal 620 and a transition of the signal 630. Furthermore, the transition of the signal 620 may require energy consumption of the logic gate 601. Thus, the transition of signal 610 may result in energy consumption associated with the logic gate 601, signal 620, and signal 630. Further details with regard to the energy consumption is described below.

The cell 600 may be associated with multiple types of energy or power (e.g., energy over time) consumption. For example, the cell may be associated with leakage energy consumption. In some embodiments, leakage energy consumption may be associated with an amount of current that is conducted by an electronic component or device when the electronic component or device is inactive. Furthermore, the cell 600 may be associated with switching energy. In some embodiments, switching energy may be associated with loading capacitance charging and/or discharging. For example, the switching energy associated with the cell 600 may be based on transitioning of the signal 630. Furthermore, the cell 600 may be associated with internal power. In some embodiments, internal energy may be associated with transition activity of signals of the cell 600. For example, the internal energy of the cell 600 may be associated with a short-circuit current (e.g., a current flowing from power to ground through multiple transistors due to such transistors simultaneously temporarily being in an 'on' state) and with the charging or discharging of an internal capacitance associated with the output of a logic gate. As an example, the short-circuit current may be associated with the logic gate 601 and the internal capacitance may be based on the transitioning of the signal 620 (e.g., from a value of '0' to a value of '1').

In some embodiments, switching energy may be due to the charging or discharging of an output load capacitance (e.g., $C_{out}$) which may include a net capacitance and a gate capacitance. In some embodiments, the net capacitance may refer to a parasitic capacitance of the connecting wire (e.g., signal 630) between the cell 600 and another cell's input node. Furthermore, the gate capacitance may refer to the total input capacitance of a cell driven by the output signal of the cell (e.g., signal 630). In some embodiments, switching energy may be based on the following equation when the transition is from a '0' to a '1':

$$E_{switching}=(C_{out}*V_{dd}^{2}/)2$$

In some embodiments, $C_{out}$ may refer to an output capacitance of a cell and $V_{dd}$ may refer to a voltage of a power source. Furthermore, in some embodiments, the internal energy may be based on the charging or discharging of an internal capacitance (e.g., $C_{int}$) and a short current during a transition time (e.g., the transition from a '0' to a '1').

As previously described, the cell 600 may correspond to a portion of a circuit. For example, inputs and outputs of the cell 600 may be coupled to inputs or outputs of additional cells that correspond to portions of the circuit. Furthermore, storage or memory components, such as a flip-flop or register, may also be coupled to inputs or outputs of cells of the circuit. The calculation of energy consumption associated with an analysis for a DPA leak may be based on the switching energy and the internal energy associated with cells of the circuit and may not be associated with other energy associated with the circuit (e.g., leakage energy, energy associated with a clock signal for a flip-flop or register, etc.). As such, a simulation file associated with a circuit may include multiple components (e.g., cells, flip-flops, etc.) that may be used to identify multiple types of energy (e.g., leakage energy, switching energy, internal energy, energy associated with a clock signal, etc.), but the DPA analysis may be based on the switching energy and the internal energy associated with a cell and not with the leakage energy, energy associated with the clock signal, and other types of energy in a circuit. As such, the identification of a DPA leak may be based on particular components or types of energy consumption.

In some embodiments, the process of determining or calculating the energy consumption may be referred to as energy extraction. The energy extraction process may be used to calculate the internal energy and the switching energy associated with the cell 600. For example, a simulation file may be processed and signal transition time points within the simulation file may be identified. Signal transitions or toggling activity at each of the time points may be updated and switching energy may be computed for each of the signal transitions in the simulation file. Examples of a simulation file include, but are not limited to, a value change dump (VCD) file, a fast signal database (FSDB) file, or any other type of simulation file that contains signal transitions or toggle activity. Furthermore, internal energy may be extracted or computed with regard to an input pin or input signal to a cell (e.g., the signal 610 to the cell 600). Additionally, the internal energy may be extracted or computed with regard to an output pin or output signal of the cell. In some embodiments, the energy consumption may be calculated based on an integral of a current value. For example, an energy waveform may be calculated based on computing the integral of a current waveform. Such a calculation may be represented by the following formula:

$$E=\int i(t)v(t)dt=\int C\frac{dv(t)}{dt}v(t)dt=\frac{1}{2}CV_{dd}^{2}$$

In some embodiments, the variable i in the above formula may refer to a measurement of current, C may refer to capacitance, v may refer to a Voltage, and $V_{dd}$ may refer to a positive supply voltage that is used.

Figure 7:
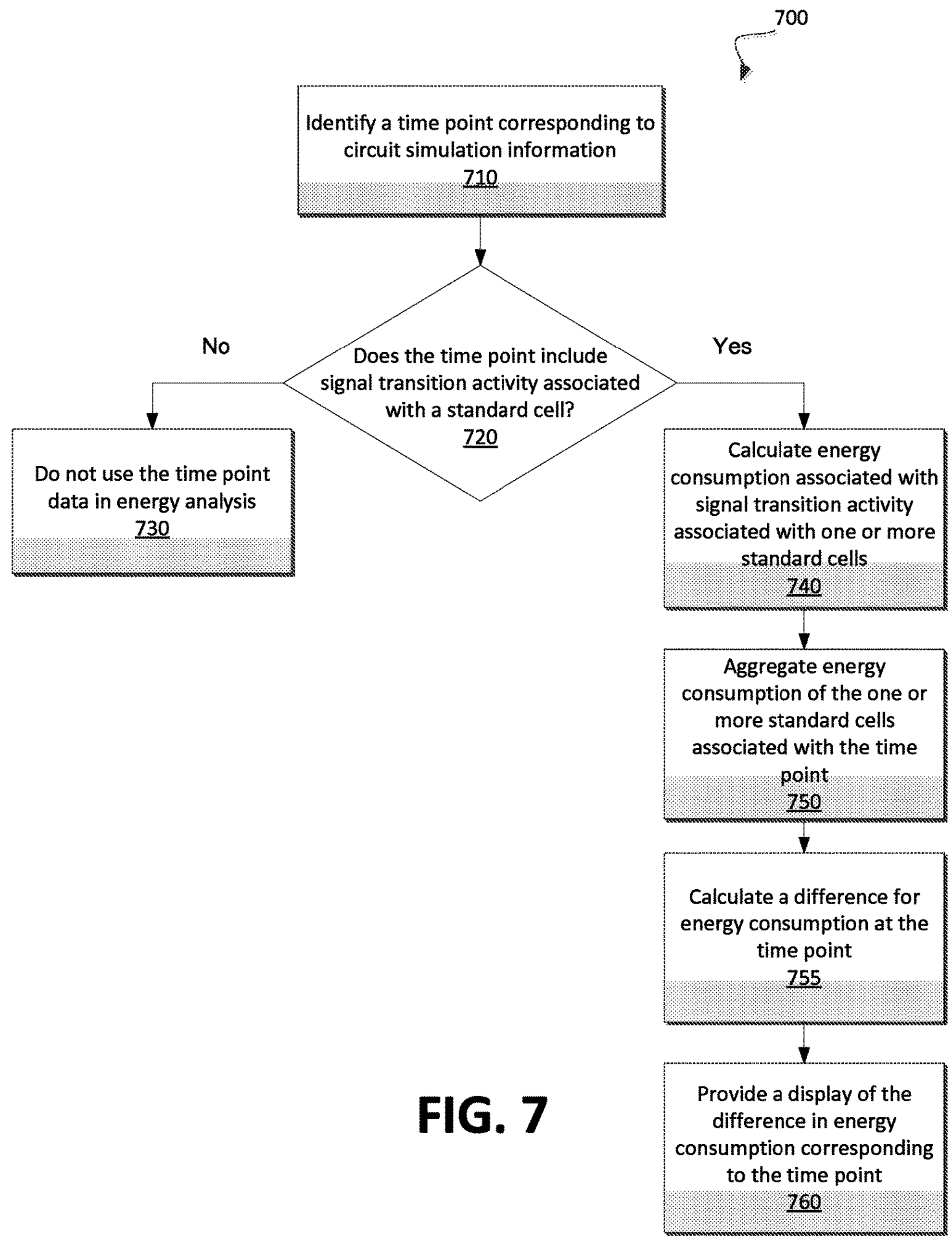
FIG. 7 is a flow diagram of an example method to provide statistical difference in aggregated energy consumption information of a circuit corresponding to a time point in accordance with some embodiments.

FIG. 7 is a flow diagram of an example method 700 to provide statistical difference in aggregated energy consumption information associated with a circuit corresponding to a time point. In general, the method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 700 may be performed by the energy analyzer 120 of FIG. 1 and/or the energy analyzer 300 of FIG. 3.

As shown in FIG. 7, the method 700 may begin with the processing logic identifying a time point corresponding to circuit simulation information (block 710). For example, the circuit simulation information may include information associated with multiple signals and multiple components of a simulated circuit. Thus, multiple time points may be associated with the circuit simulation information. The processing logic may further determine if a particular time point from the circuit simulation information includes signal transition activity associated with a cell. For example, a time point associated with signal transitions associated with a cell (e.g., cell 600) may be identified from the multiple time points associated with the circuit simulation information. In some embodiments, the signal transitions that are used to identify the time points may include signal transitions associated with the cell 600 and not signal transitions associated with a clock signal or leakage energy. The processing logic may further determine if the identified time point includes signal transition activity associated with a cell (block 720). If the identified time point does not include signal transition activity associated with a cell, then the time point may not be used to calculate energy consumption associated with the circuit (block 730). However, if the identified time point does include signal transition activity associated with a cell, then the time point may be used to calculate energy consumption associated with the signal activity associated with one or more cells (block 740). Furthermore, the processing logic may aggregate energy consumption of one or more cells associated with the time point (block 750). For example, the switching energy and the internal energy of each cell may be aggregated to calculate a total cell energy and the total cell energy for each cell associated with the time point may be aggregated to calculate an aggregated or total energy consumption of the circuit at the time point. Furthermore, the processing logic may calculate a difference for energy consumption at the time point (block 760). Subsequently, the processing logic may provide a display of the difference in energy consumption corresponding to the time point (block 760). An example of a difference may include, but is not limited to, a statistical difference in energy consumption at the time point. For example, at each time point, a statistical difference between the two groups or sets of simulation information may be calculated. In some embodiments, a statistical difference between the two groups or sets of simulation information may be calculated by subtracting the averages of the aggregated energy consumption values of the first and second groups or sets of simulation information (e.g., across multiple time points). In such an embodiment, the statistical difference may be calculated by the following formula:

$$\text{Statistical Difference}=|A_1-A_0|$$

In some embodiments, $A_0$ may be the average value (e.g. energy usage or consumption) over multiple different input tests or simulations at the given time point. $A_1$ may be the average value of the time point for only the input tests or simulations where the value of the selector bit or signal is at a specific value (e.g., either a '0' or a '1').

Comparison of the statistical difference to some threshold value may be used to evaluate whether the observed energy usage or consumption of the circuit design at a given time point is indicative of a possible DPA leak. The comparison of the distribution number to a threshold may be performed by selecting or defining a threshold energy difference value. If the subtractive statistical difference is larger than the selected threshold energy difference value, then the activity of the circuit design (e.g., energy usage or consumption) may be identified as a possible DPA leak.

In alternative embodiments, the statistical difference may be calculated at each time point for the first and second groups or sets of simulation information based on a statistical hypothesis test (e.g., a T-Test) as defined by the following formula:

$$\text{Statistical Difference}=\frac{(A_1-A_0)}{\sqrt{\frac{S_0^2}{N_0}+\frac{S_1^2}{N_1}}}$$

In some embodiments, $N_0$ may be the number of simulations that have been run where the value of the selector bit or signal is at a particular value (e.g., either a '0'), $N_1$ may be the number of simulations where the value of the selector bit or signal value is at a different particular value (e.g., a '1'), $A_0$ may be the average value of energy usage or consumption over the different input tests or simulations at the time point where the value of the selector bit or signal value is at the particular value (e.g., a '0'), and $A_1$ may be the average value of energy usage or consumption for the time point for only the input tests or simulations where the value of the selector bit is at the different specific value. $S_0$ may be defined by the following equation that may be based on input tests or simulations where the value of the selector signal or bit is at the particular value (e.g., a '0'):

$$S_0=\frac{\sum_{t=1}^{N_0}(E_t)^2}{N_0(N_0-1)}-\frac{\left(\sum_{t=1}^{N_0}E_t\right)^2}{N_0^2(N_0-1)}$$

In some embodiments, $E_t$ may be the energy usage or consumption value at the given time point for the input test or simulation t. $S_1$ may calculated with the following equation that may be based on input tests or simulations where the value of the selector signal or bit is at the different particular value (e.g., a '1').

$$S_1=\frac{\sum_{t=1}^{N_1}(E_t)^2}{N_1(N_1-1)}-\frac{\left(\sum_{t=1}^{N_1}E_t\right)^2}{N_1^2(N_1-1)}$$

In some embodiments, the statistical difference described above may be compared to a t distribution. Comparison of the statistical difference to the distribution may be used to evaluate whether the observed energy usage or consumption of the circuit design at a given time point is indicative of a possible DPA leak. The comparison of the distribution number to the t distribution may be performed by selecting a value from the distribution corresponding to a selected significance level (e.g., a 5% significance level). If the statistical difference is larger than the value of the distribution corresponding to the selected significance level, then the activity of the circuit (e.g. the energy usage or consumption) may be identified as a possible DPA leak.

Figure 8:
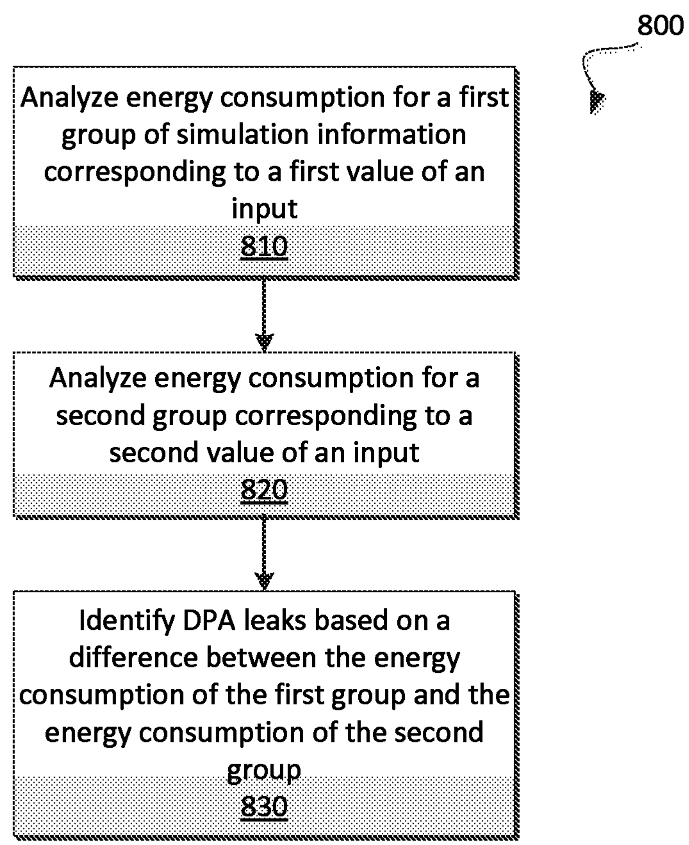
FIG. 8 is a flow diagram of an example method to identify a possible DPA leak based on a difference between groups of simulation information or data in accordance with some embodiments.

FIG. 8 is a flow diagram of an example method 800 to identify a possible or potential DPA leak based on a difference between groups of simulation information or data in accordance with some embodiments. In general, the method 800 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 800 may be performed by the energy analyzer 120 of FIG. 1 and/or the energy analyzer 300 of FIG. 3.

As shown in FIG. 8, the method 800 may begin with the processing logic analyzing energy consumption for a first group of simulation information or data corresponding to a first value of an input used in the simulation of a circuit (block 810). The processing logic may further analyze energy consumption for a second group of simulation information or data corresponding to a second value of the input used in the simulation of the circuit (block 820). For example, the first group of simulation information associated with a circuit may be based on a particular input or input bit or intermediate value being at a first value (e.g., '0') and the second group of simulation information associated with the same circuit may be based on the input or input bit or intermediate value being at a second value (e.g., '1'). Thus, the simulation information associated with a circuit may be separated into two subsets corresponding to the first group (e.g., where the input or input bit or intermediate value is at a value of '0') and the second group (e.g., where the input or input bit or intermediate value is at a value of '1'). Thus, the simulation information may be separated based on the input or stimulus used in the simulation of a circuit. The input bit or intermediate bit may also be referred to as a selector bit or selector signal. The processing logic may further identify possible DPA leaks based on a difference or statistical difference between the energy consumption of the first group and the energy consumption of the second group (block 830). For example, a possible DPA leak may be identified at a time point associated with the first group and the second group when the statistical difference between the energy consumption of the first group at a time point and the energy consumption of the second group at the same time point exceeds a threshold value of statistical difference in energy consumption.

Figure 9:
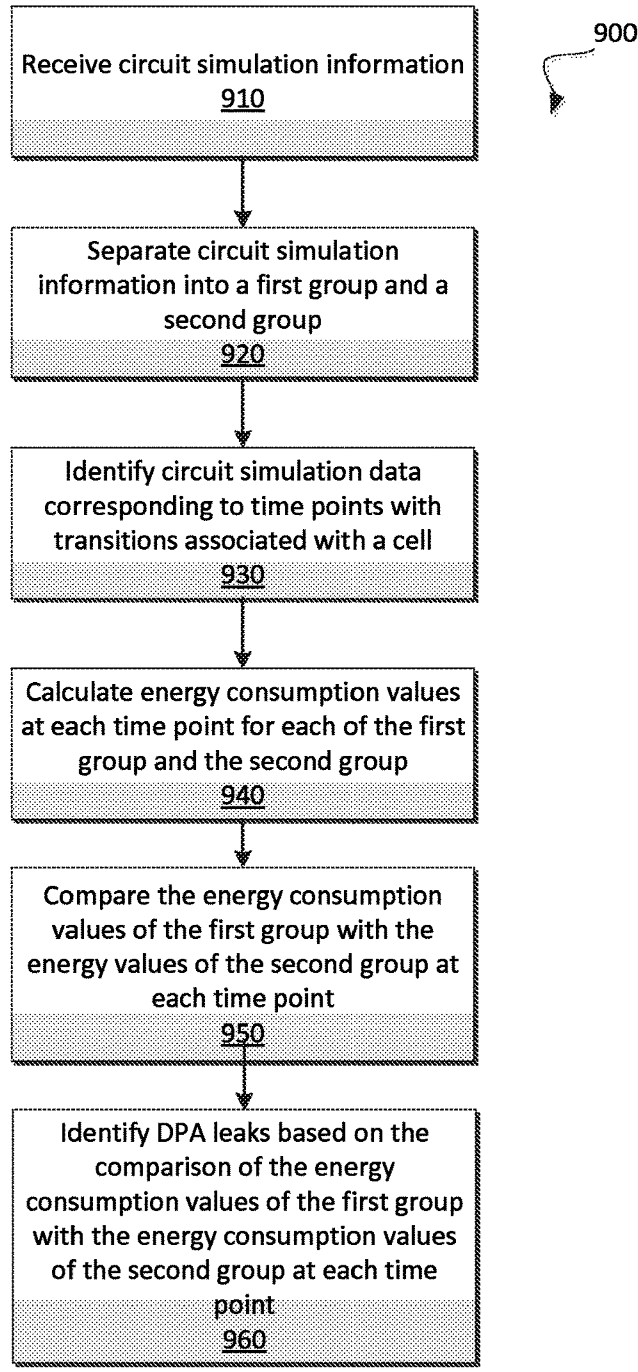
FIG. 9 is a flow diagram of an example method to identify a possible DPA leak based on differences in energy consumption in accordance with some embodiments.

FIG. 9 is a flow diagram of an example method 900 to identify a possible DPA leak based on differences in energy consumption in accordance with some embodiments. In general, the method 900 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 900 may be performed by the energy analyzer 120 of FIG. 1 and/or the energy analyzer 300 of FIG. 3.

As shown in FIG. 9, the method 900 may begin with the processing logic receiving circuit simulation information or data (block 910). The processing logic may further separate the circuit simulation information into a first group and a second group (block 920). For example, the circuit simulation information may be separated based on a value of an input or input bit or intermediate value used in a simulation of a circuit. In some embodiments, the first group may correspond to simulation information when a particular input or input bit or intermediate value is at a first value and the second group may correspond to simulation information when the input or input bit or intermediate value is at a second value that is different than the first value. As an example, the first group may be associated with an $18^{th}$ bit of an input being at the first value and the second group may be associated with the $18^{th}$ bit of the input being at a second value. In some embodiments, the intermediate value that is used may not be a signal that appears in the circuit design. The processing logic may further identify simulation information corresponding to time points with signal transitions associated with a cell (block 930). For example, a subset of time points included in the simulation information may be identified based on the time point including information associated with the transition of a signal associated with a cell (e.g., cell 600). The processing logic may further calculate energy values at each time point for each of the first group and the second group (block 940). For example, energy consumption or use from signals transitioning at a time point in response to inputs including the input or input bit at the first value may be aggregated to calculate an aggregated energy consumption for the first group and energy consumption or use from signals transitioning at the time point in response to inputs including the input or input bit at the second value may similarly be aggregated to calculate an aggregated energy consumption for the second group.

Referring to FIG. 9, the processing logic may compare the energy consumption values of the first group with the energy consumption values of the second group for each time point (block 950). For example, the energy consumption calculated from the simulation information of the first group at a time point may be compared with the energy consumption calculated from the simulation information of the second group at a corresponding time point. In some embodiments, the energy consumption value associated with the second group may be subtracted from the energy consumption value associated with the first group to calculate an energy consumption difference value. The processing logic may further identify possible DPA leaks based on the comparison of the energy consumption values of the first group with the energy consumption values of the second group (block 960). For example, if the energy consumption difference value associated with a time point exceeds a threshold value then a possible DPA leak may be identified for the time point. However, if the energy consumption difference value associated with the time point does not exceed a threshold value then a possible DPA leak may not be identified for the time point.

Figure 10A:
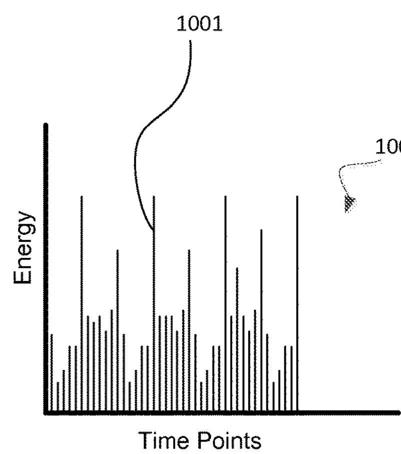
FIG. 10A illustrates an example energy waveform of a circuit in response to a first stimulus in accordance with some embodiments of the disclosure.
Figure 10B:
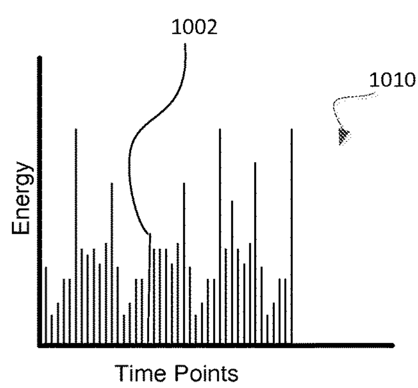
FIG. 10B illustrates an example energy waveform of a circuit in response to a second stimulus in accordance with some embodiments of the disclosure.
Figure 10C:
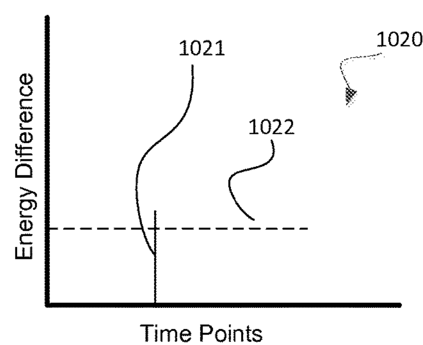
FIG. 10C illustrates a representation of the difference in energy consumption of the circuit in response to the first stimulus and in response to the second stimulus in accordance with some embodiments of the disclosure.

FIGS. 10A-10C illustrate example energy waveforms of a circuit. In general, the energy waveforms 1000, 1010, and 1020 may be provided or generated by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the energy waveforms 1000, 1010, and 1020 may be provided by the energy analyzer 120 of FIG. 1 and/or the energy analyzer 300 of FIG. 3. In some embodiments, the energy waveform 1000 may correspond to an energy waveform of a circuit in response to a particular input or input bit or intermediate value to the circuit and used in the simulation of the circuit at a first value, the energy waveform 1010 may correspond to an energy waveform of the circuit in response to the input or input bit or intermediate value to the circuit at a second value, and the energy waveform 1020 may correspond to a statistical difference between the energy waveform 1000 and the energy waveform 1010.

As shown in FIG. 10A, the energy waveform 1000 may include energy consumption values at various time points. For example, the energy waveform 1000 may include an energy consumption value 1001 at a particular time point. Furthermore, as shown in FIG. 10B, the energy waveform 1010 may include an energy consumption value 1002 at a corresponding time point. The energy waveform 1020 of FIG. 10C may represent a difference between the energy waveform 1000 and the energy waveform 1010. For example, in some embodiments, the energy consumption value 1001 of the energy waveform 1000 may be larger than the energy consumption value 1002 of the energy waveform 1010. Such a difference may be represented by the energy consumption difference value 1021 of the energy waveform 1020. For example, the energy consumption difference value 1021 may correspond to the energy consumption value 1001 at a time point subtracted by the energy consumption value 1002 at a corresponding time point.

In some embodiments, if the energy consumption difference value exceeds a threshold amount of energy consumption then a possible DPA leak may be identified in association with the corresponding time point. For example, if the energy consumption difference value 1021 exceeds an energy consumption difference threshold value 1022 then a possible DPA leak may have occurred at the time point corresponding to the energy consumption difference value 1021.

Figure 11:
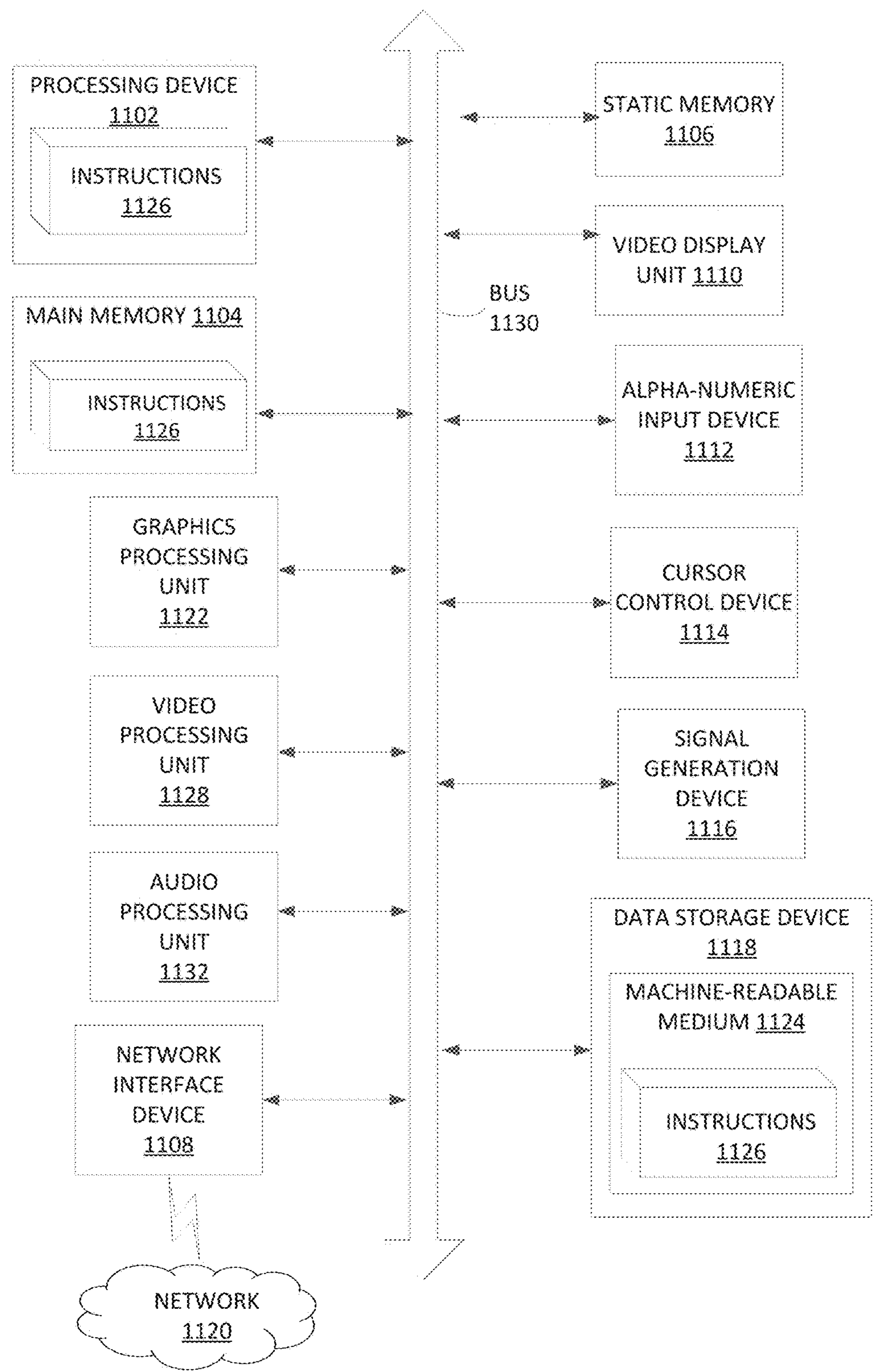
FIG. 11 illustrates a block diagram of an embodiment of a computer system in which some embodiments of the disclosure may operate.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, and a signal generation device 1116 (e.g., a speaker).

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1126 include instructions to implement functionality corresponding to an energy analyzer (e.g., an energy analyzer 120 of FIG. 1 or an energy analyzer 300 of FIG. 3). While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

receiving a first set of simulation information and a second set of simulation information associated with a circuit, wherein the first set of simulation information is associated with a particular signal of the circuit being at a first value during a simulation of a design corresponding to the circuit and wherein the second set of simulation information is associated with the particular signal of the circuit being at a second value that is different than the first value during another simulation of the design corresponding to the circuit;

calculating energy consumption values associated with transitions of a plurality of signals of the circuit for each of the first and second sets of simulation information associated with the circuit;

aggregating the energy consumption values associated with the transitions of the plurality of signals for each time point of a plurality of time points based on when each of the transitions of the plurality of signals occurs for each of the first and second sets of simulation information; and identifying, by a processing device, a particular time point at which a possible Differential Power Analysis (DPA) leak is present, wherein the particular time point is one of the plurality of time points, and wherein the particular time point is identified based on a difference of the aggregated energy consumption values between the first and second sets of simulation information.

2. The method of claim 1, wherein the identifying of the particular time point at which the possible DPA leak is present is further based on the difference of the aggregated energy consumption values at the particular time point exceeding a threshold value of energy consumption difference.

3. The method of claim 1, further comprising:

providing an energy waveform corresponding to the difference of the aggregated energy consumption values at each of the plurality of time points, wherein the difference of the aggregated energy consumption values at each of the time points identifies the difference of energy consumption of the circuit at each corresponding time point of the plurality of time points.

4. The method of claim 1, wherein the calculating of the energy consumption values associated with the transitions of the plurality of signals of the circuit is further based on energy consumption of a cell associated with the circuit.

5. The method of claim 4, wherein the energy consumption of the cell is based on a switching energy and an internal energy associated with the cell and is not based on a leakage energy associated with the cell.

6. The method of claim 1, further comprising:

identifying the aggregated energy consumption value of a time point of the plurality of time points associated with the first group of simulation information; and identifying the aggregated energy consumption value of a corresponding time point associated with the second group of simulation information, wherein the identifying of the particular time point at which a possible DPA leak is present is further based on the time point associated with the first group of simulation information and the corresponding time point associated with the second group of simulation information.

7. A system comprising:

a memory; and a processing device coupled with the memory to:

receive simulation information of a circuit design associated with a circuit, wherein the simulation information comprises a first group of the simulation information associated with a particular signal of the circuit being at a first value during a simulation of the circuit design associated with the circuit and a second group of the simulation information associated with the particular signal of the circuit being at a second value that is different than the first value during another simulation of the circuit design associated with the circuit:

calculate energy consumption values associated with transitions of a plurality of signals of the circuit based on the simulation information;

aggregate the energy consumption values associated with the transitions of the plurality of signals for each time point of a plurality of time points based on when each of the transitions of the plurality of signals occurs; and identify a particular time point at which a possible Differential Power Analysis (DPA) leak is present, wherein the particular time point is one of the plurality of time points, and wherein the particular time point is identified based on a difference of the aggregated energy consumption values.

8. The system of claim 7, wherein the identifying of the particular time point at which the possible DPA leak is present is further based on the difference of the aggregated energy consumption values at the particular time point exceeding a threshold value of difference of energy consumption.

9. The system of claim 7, wherein the processing device is further to:

provide an energy waveform corresponding to the difference of the aggregated energy consumption values at each of the plurality of time points, wherein the difference of the aggregated energy consumption values at each of the time points identifies the difference of the energy consumption of the circuit at each corresponding time point of the plurality of time points.

10. The system of claim 7, wherein the calculating of the energy consumption values associated with the transitions of the plurality of signals of the circuit is further based on energy consumption of a cell associated with the circuit.

11. The system of claim 10, wherein the energy consumption of the cell is based on a switching energy and an internal energy associated with the cell and is not based on a leakage energy associated with the cell.

12. The system of claim 7, wherein the processing device is further to:

identify the aggregated energy consumption value of a time point of the plurality of time points associated with the first group of simulation information; and identify the aggregated energy consumption value of a corresponding time point associated with the second group of simulation information, wherein the identifying of the particular time point at which a possible DPA leak is present is further based on the time point associated with the first group of simulation information and the corresponding time point associated with the second group of simulation information.

13. A non-transitory computer readable medium including data that, when accessed by a processing device, cause the processing device to perform operations comprising:

receiving a first group of simulation information and a second group of simulation information of a circuit design, wherein the first group of simulation information is associated with a particular signal of the circuit design being at a first value during a simulation of the circuit design and wherein the second group of simulation information is associated with the particular signal of the circuit design being at a second value that is different than the first value during another simulation of the circuit design:

calculating energy consumption values associated with transitions of a plurality of signals for the first and second groups of simulation information;

aggregating the energy consumption values associated with a time point based on transitions of the plurality of signals of the circuit design that occur at the time point for the first and second groups of simulation information; and identifying a particular time point at which a possible Differential Power Analysis (DPA) leak is present, wherein the particular time point is present if a difference in the aggregated energy consumption at the particular time point between the first and second groups of simulation information exceeds a threshold value.

14. The non-transitory computer readable medium of claim 13, wherein the calculating of the energy consumption values is further based on energy consumption of a cell used in the circuit design.

15. The non-transitory computer readable medium of claim 14, wherein the energy consumption of the cell is based on a switching energy and an internal energy associated with the cell in response to the transitions of the plurality of signals and is not based on a leakage energy associated with the cell.

16. The non-transitory computer readable medium of claim 13, the operations further comprising:

identifying the aggregated energy consumption value of the time point based on the first group of simulation information associated with the particular signal at the first value; and identifying the aggregated energy consumption value of a corresponding time point based on the second group of simulation information associated with the particular signal at the second value, wherein the identifying of the particular time point at which the possible DPA leak is present is further based on the time point associated with the first group of simulation information and the corresponding time point associated with the second group of simulation information exceeding the threshold value.

17. The non-transitory computer readable medium of claim 13, wherein the circuit design corresponds to a cryptographic hardware circuit.

* * * * *